(12) United States Patent
Marozau et al.

(10) Patent No.: US 10,761,608 B2
(45) Date of Patent: Sep. 1, 2020

(54) METHOD AND WEARABLE APPARATUS FOR SYNCHRONIZING A USER WITH A VIRTUAL ENVIRONMENT

(71) Applicants: TESLA STUDIOS LIMITED, Edinburgh, Midlothian, Scotland (GB); Siarhei Khurs, Brest (BY); Raman Aleksandrovich, Minsk (BY)

(72) Inventors: Dzmitry Marozau, Scotland (GB); Siarhei Khurs, Brest (BY); Raman Aleksandrovich, Minsk (BY)

(73) Assignee: VR ELECTRONICS LIMITED, London (GB)

( * ) Notice: Subject to any disclaimer, the term of this patent is extended or adjusted under 35 U.S.C. 154(b) by 0 days.

(21) Appl. No.: 16/292,299

(22) Filed: Mar. 4, 2019

(65) Prior Publication Data

US 2019/0196595 A1      Jun. 27, 2019

Related U.S. Application Data

(63) Continuation of application No. 14/905,094, filed as application No. PCT/EA2014/000017 on Aug. 6, 2014, now Pat. No. 10,437,334.

(30) Foreign Application Priority Data

Jul. 15, 2013   (EA) .................................. 201301064

(51) Int. Cl.
*G06F 3/01*       (2006.01)
*G06F 1/16*       (2006.01)
(Continued)

(52) U.S. Cl.
CPC .............. *G06F 3/016* (2013.01); *G06F 1/163* (2013.01); *G06F 3/011* (2013.01); *G06F 3/014* (2013.01);
(Continued)

(58) Field of Classification Search
CPC ........ G06F 3/016; G06F 1/163; G06F 13/102; G06F 3/011; G06F 3/014; G06F 3/015; G06T 19/006; G09G 5/12; H04B 1/385
(Continued)

(56) References Cited

U.S. PATENT DOCUMENTS 5,583,478 A      12/1996   Renzi
5,963,891 A      10/1999   Walker et al.
(Continued)

FOREIGN PATENT DOCUMENTS

CN          1272798 A      11/2000
EP          1533678 A1      5/2005
(Continued)

OTHER PUBLICATIONS

Communication dated Feb. 15, 2019, from State Intellectual Property Office of the P.R.C. in counterpart application No. 201480050662.8.

(Continued)

*Primary Examiner* — Hirdepal Singh
(74) *Attorney, Agent, or Firm* — Sughrue Mion, PLLC

(57) ABSTRACT

The proposed method relates to the field of providing physical feedback to a user from a virtual application, particularly a computer game or other software applications. The method for interactive physiological and technological synchronization of a user with a virtual environment includes taking the user's biometric and/or kinematic parameters, transferring the user's biometric and/or kinematic parameters to an application program, generating feedback signals in the application program, transmitting the feedback signals to a computing device, processing the feedback signals and supplying feedback pulses which invoke physical sensations in the nervous system of the user through contact with the user's skin, wherein the feedback pulses are (Continued)

Figure 1:
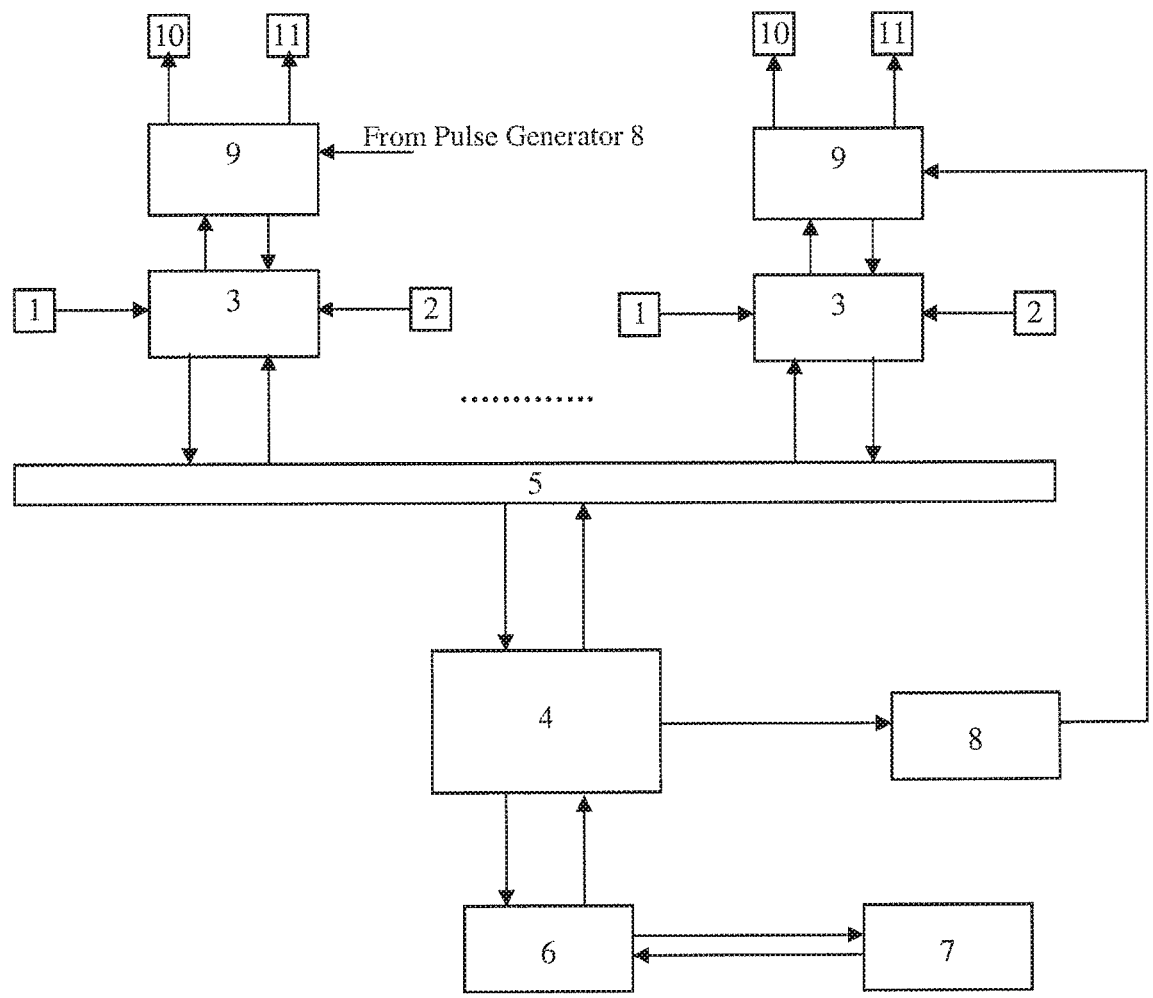

supplied using the principle of cascaded distribution of electrical pulses. Also claimed are variants of a wearable apparatus for implementation of the proposed method. The proposed method and apparatus allow for creating a deep-sense reality for the user.

11 Claims, 7 Drawing Sheets

(51) Int. Cl.
    *G06F 13/10*     (2006.01)
    *G06T 19/00*     (2011.01)
    *G09G 5/12*     (2006.01)
    *H04B 1/3827*     (2015.01)

(52) U.S. Cl.
    CPC ............ *G06F 3/015* (2013.01); *G06F 13/102* (2013.01); *G06T 19/006* (2013.01); *G09G 5/12* (2013.01); *H04B 1/385* (2013.01)

(58) Field of Classification Search
    USPC ...................................................... 340/407.1
    See application file for complete search history.

(56) References Cited

U.S. PATENT DOCUMENTS

| | | | |
|---|---|---|---|
| 6,930,590 B2 * | 8/2005 | Ling | G06F 3/016 310/319 |
| 7,046,151 B2 | 5/2006 | Dundon | |
| 7,967,679 B2 | 6/2011 | Ombrellaro et al. | |
| 8,228,202 B2 | 7/2012 | Buchner et al. | |
| 9,170,425 B1 * | 10/2015 | Harrison | G02B 17/06 |
| 9,411,780 B1 | 8/2016 | Awad | |
| 9,904,356 B2 | 2/2018 | Laughlin | |
| 2005/0113167 A1 | 5/2005 | Buchner et al. | |
| 2008/0246737 A1 * | 10/2008 | Benali-Khoudja | G09B 21/003 345/173 |
| 2009/0131165 A1 | 5/2009 | Buchner et al. | |
| 2010/0103075 A1 * | 4/2010 | Kalaboukis | A63F 13/02 345/8 |
| 2011/0063208 A1 * | 3/2011 | Van Den Eerenbeemd | G06F 3/011 345/156 |
| 2014/0070957 A1 | 3/2014 | Longinotti-Buitoni | |
| 2016/0142830 A1 * | 5/2016 | Hu | G10L 21/14 434/185 |
| 2016/0187974 A1 | 6/2016 | Mallinson | |
| 2017/0106277 A1 | 4/2017 | Perdigon Rodriguez | |
| 2017/0115742 A1 | 4/2017 | Xing | |
| 2017/0332979 A1 | 11/2017 | Nagisetty | |
| 2018/0081439 A1 | 3/2018 | Daniels | |
| 2020/0012345 A1 * | 1/2020 | Wang | G06F 3/017 |

FOREIGN PATENT DOCUMENTS

| | | |
|---|---|---|
| KR | 10-1078320 B1 | 10/2011 |
| RU | 4173 U1 | 5/1997 |

OTHER PUBLICATIONS

International Search Report dated Apr. 9, 2015, in counterpart International Application No. PCT/ EA 2014/000017.

\* cited by examiner

METHOD AND WEARABLE APPARATUS FOR SYNCHRONIZING A USER WITH A VIRTUAL ENVIRONMENT

CROSS-REFERENCE TO RELATED APPLICATIONS

This is a Continuation of application Ser. No. 14/905,094 filed Jan. 14, 2016, claiming priority based on International Application No. PCT/EA2014/000017 filed Aug. 6, 2014, whose disclosure is incorporated herein in its entirety by reference, which international application claims priority of a patent application EA201301064 filed on Jul. 15, 2013.

FIELD OF THE INVENTION

The present invention belongs to the field of providing physical feedback to a user from a virtual application, a computer game or other program applications in particular.

BACKGROUND OF THE INVENTION

The development of information technology allowed creating technical and psychological phenomena that are called "virtual reality" or "VR-systems" in scientific literature. The development of programming technique, the fast increase in semiconductor integrated circuit throughput, the development of special facilities for transmitting information to a user and getting feedback provided a person who gets into a virtual world with a new quality of perception and gave him an opportunity to not only observe and experience, but also act on his own.

A comprehensive VR-system must possess the following properties: it replies to the actions of a user (is interactive), it introduces a 3D-graphics virtual world on a real time basis and produces an immersion effect by means of a sensuous connectivity system. For this purpose the system and the user must be fully synchronized.

At present there are a large number of VR-systems that provide interactivity and a realistic physical feedback in a virtual environment.

The most close related art (herein called "prototype") of the present invention is a method for transferring physical sensations to the body of a user through feedback from an application program. The method includes generating feedback signals in an application program, transmitting feedback signals to a wearable receiver and transmitting physical feedback sensations based on the feedback signals received to the body and/or the head of the user, using the user's skin as an interface, and a wearable accessory for the method. The accessory is equipped with various mechanical and electrical triggers for generating multi-sensory feedback from a virtual environment and various biometric and environmental sensors. The main control panel of the application software and various monitoring tools regulated by the user depending on the layers of the wearable accessory control the intensity of the tactile senses being stimulated.

The disadvantage of the aforementioned invention is an insufficiently sensible adjustment of feedback pulses received from one or another type of interference. Manual "less-more" settings change is the extent of the adjustment. General adjustment sets a certain pattern of pulse behavior, the pattern being identical for all interfering objects. The impacts of pulses are selective and don't transmit full range of physical sensation from various types of interference with various objects and mediums in a virtual environment.

OBJECT AND BRIEF SUMMARY OF THE INVENTION

The object of the present invention is to create a deep-sense reality through sufficiently sensible adjustment of feedback pulses' behavior; to transmit any change in virtual environment to the level of user's sensory perception with getting a maximum feeling experience of the occurring events; to establish an instant direct (feedforward) and feedback connections between the user and the digital environment intelligence in an interactive triode; to establish a maximum possible immersion in the gaming or simulation process; to create a proper digital double.

The aforementioned object is achieved in the following way. An inventive method is proposed for interactive physiological and technological synchronization of a user with a virtual environment that includes: taking the user's biometric and/or kinematic parameters, transferring the user's biometric and/or kinematic parameters to an application program, generating feedback signals in the application program, transmitting the feedback signals to a computing device, processing the feedback signals and supplying feedback pulses which invoke physical sensations in the nervous system of the user through contact with the user's skin, wherein the feedback pulses are supplied using the principle of the cascaded distribution of electrical pulses.

For implementation of the inventive method, a wearable apparatus is proposed for the interactive physiological and technological synchronization of a user with a virtual environment, one of the variants of which comprises at least one module containing at least one element for collecting biometric and/or kinematic parameters of the user and/or at least one element for supplying electrical feedback pulses and at least one slot for connecting at least one working unit selected from the following group:
 a device for collecting biometric and/or kinematic parameters of a user;
 a device for supplying electrical feedback pulses;
 a computing device unit;
 an electrical pulse generating unit;
 power supply unit;
 a unit for coupling with an application program;
 a unit for coupling with a mobile device that functions as a display and/or a remote program control console; and
 a localization unit,
wherein the module is made in the form of a flexible plate consisting of three layers, while the elements for collecting biometric and/or kinematic parameters and/or the elements for supplying electrical feedback pulses are placed on the outer side of the layer being in contact with the user's skin, and the slot for connection of working units is placed on the outer side of the external layer.

The second option for implementation of the inventive method is a wearable apparatus for the interactive physiological and technological synchronization of a user with a virtual environment comprises at least one element for collecting biometric and/or kinematic parameters of a user and/or at least one element for supplying electrical feedback pulses and at least one slot for connecting at least one working unit selected from the following group:
 a device for collecting biometric and/or kinematic parameters of a user;
 a device for supplying electrical feedback pulses;
 a computing device unit;
 an electrical pulse generating unit;
 a power supply unit;
 a unit for coupling with an application program;

a unit for coupling with a mobile device that functions as a display and/or a remote program control console; and a localization unit, wherein the wearable apparatus is an elastic shell capable of adjusting to fit the user's body, wherein the layer being in contact with the user's skin is electrically conductive, while the elements for collecting biometric and/or kinematic parameters and/or the elements for supplying electrical feedback pulses are placed on the electrically conductive layer on the side being in contact with the body of the user.

The wearable apparatus might be made in the form of a piece of clothing that consists of an elastic shell or of modular plates that are linked with elastic material.

A preferable device for coupling with an application program is a wireless communication module or a wired communication port, a USB or a COM-interface in particular.

A preferable localization device is a UPS module or an echolocation module, a system of laser emitters, or a multi-modular 3D system.

The present invention allows for providing full-featured synchronization and creating a deep-sense reality; transmitting any change in virtual environment to the level of the user's sensory perception with getting maximum experience of the events; establishing instant interactive direct connection and feedback between the user and the digital environment intelligence; providing a maximum immersion in gaming or simulation process; creating a proper digital double (twin).

DESCRIPTION OF DRAWINGS OF THE INVENTION

The invention is illustrated in the following drawings.

FIG. 1. An overall scheme (flow chart) of the inventive method for the interactive physiological and technological synchronization of a user with a virtual environment.

Figure 2:
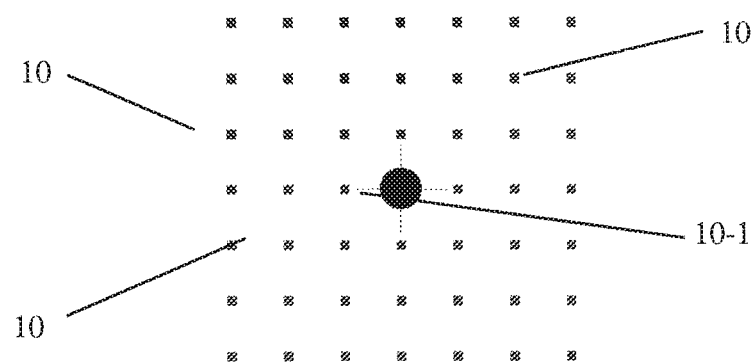
Figure 3:
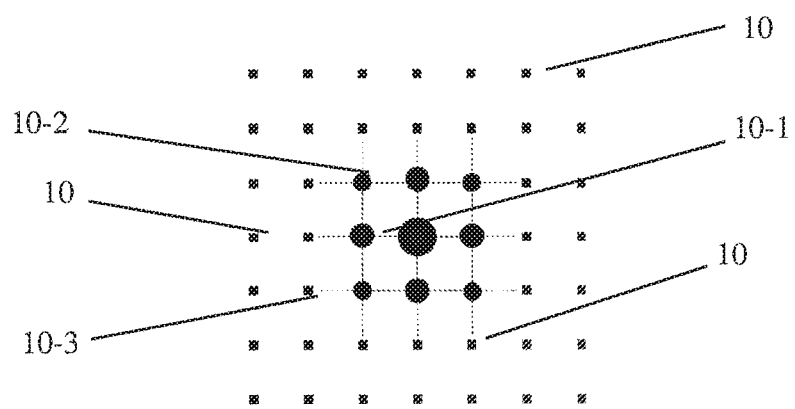
Figure 4:
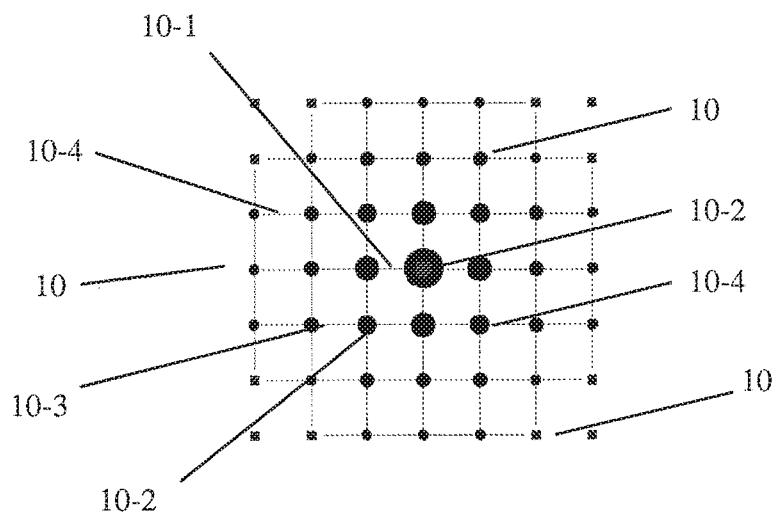
Figure 5:
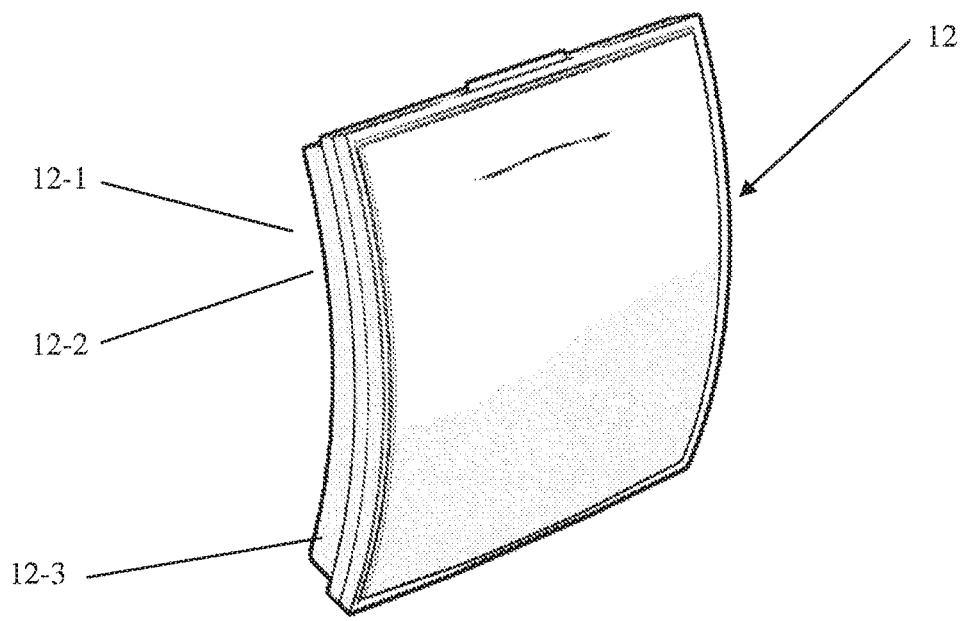

FIG. 2. Cascaded system of electrical pulses distribution, step 1;

FIG. 3. Cascaded system of electrical pulses distribution, step 2;

FIG. 4. Cascaded system of electrical pulses distribution, step 3;

FIG. 5. General view of the invention in the form of a flexible three-layer plate.

Figures 6, 7, 8:
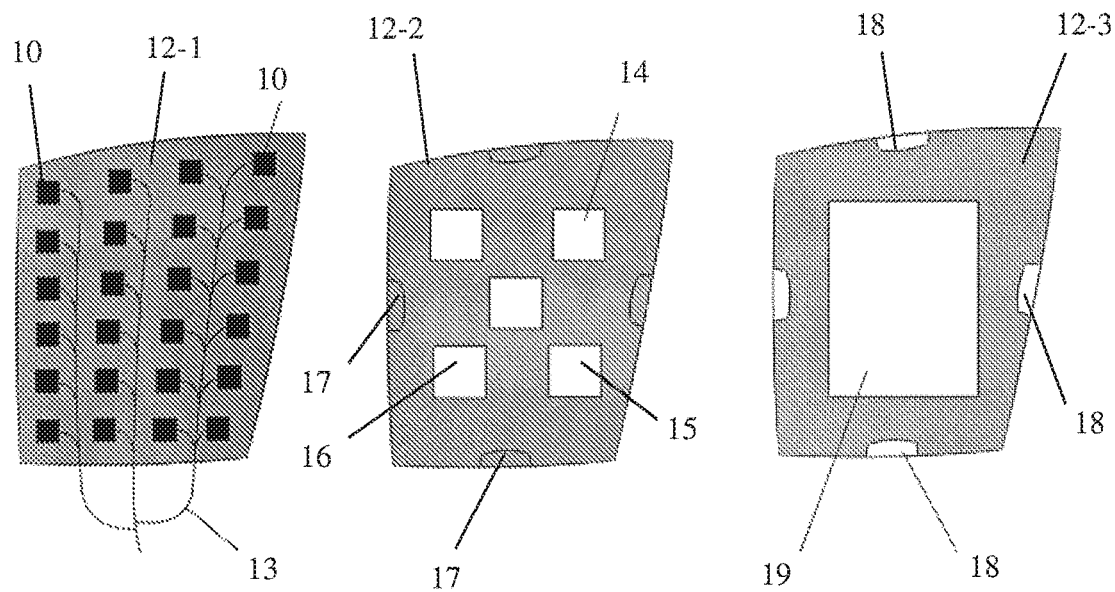

FIG. 6. View of the first layer of the flexible plate in contact with the user's skin.

FIG. 7. View of the inner layer of the flexible plate.

FIG. 8. View of the outside layer of the flexible plate.

Figure 9:
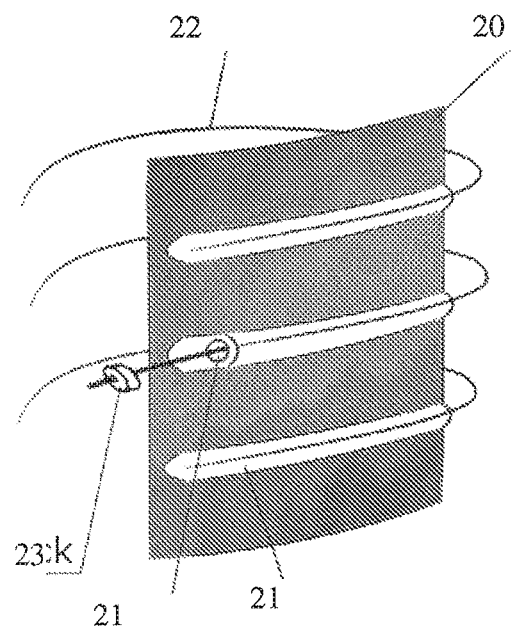

FIG. 9. View of the outer side of the wearable apparatus in the form of a flexible cover.

Figure 10:
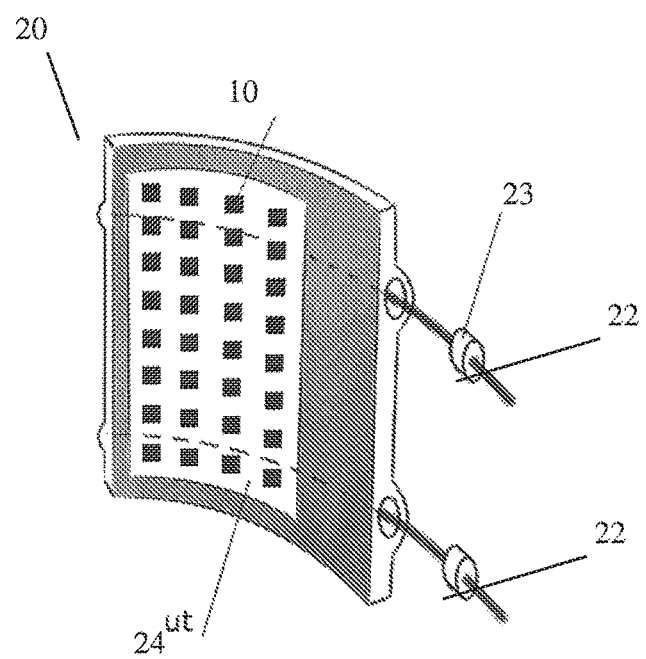

FIG. 10. View of the inner side of the wearable apparatus in the form of a flexible cover.

Figure 11:
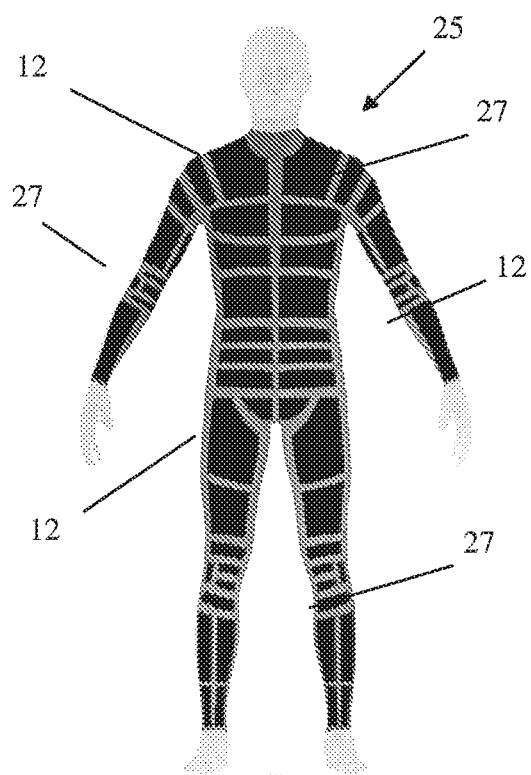

FIG. 11. Wearable apparatus in the form of a modular suit, front view.

Figure 12:
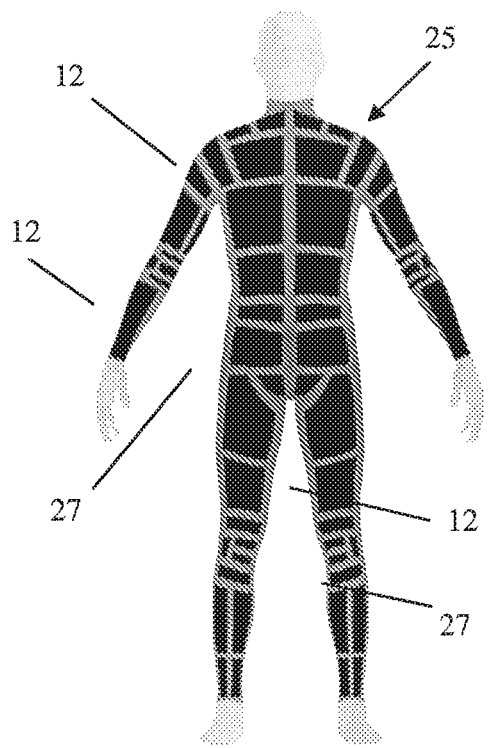

FIG. 12. Wearable apparatus in the form of a modular suit, end view.

Figure 13:
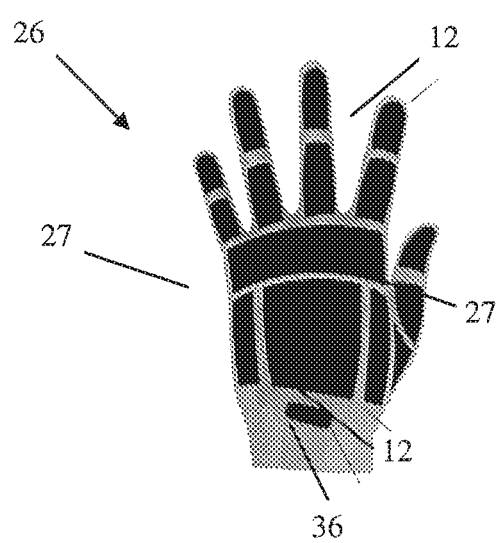

FIG. 13. Modular glove-manipulator, view from the outer side of the palm.

Figure 14:
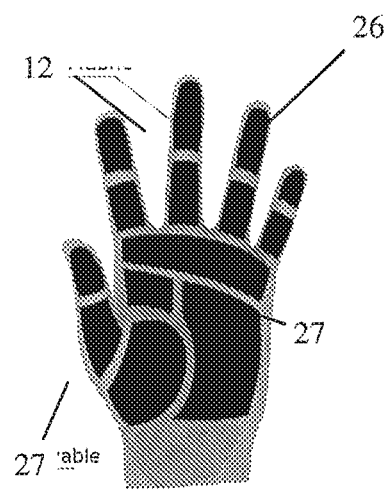

FIG. 14. Modular glove-manipulator, view from the inner side of the palm.

Figure 15:
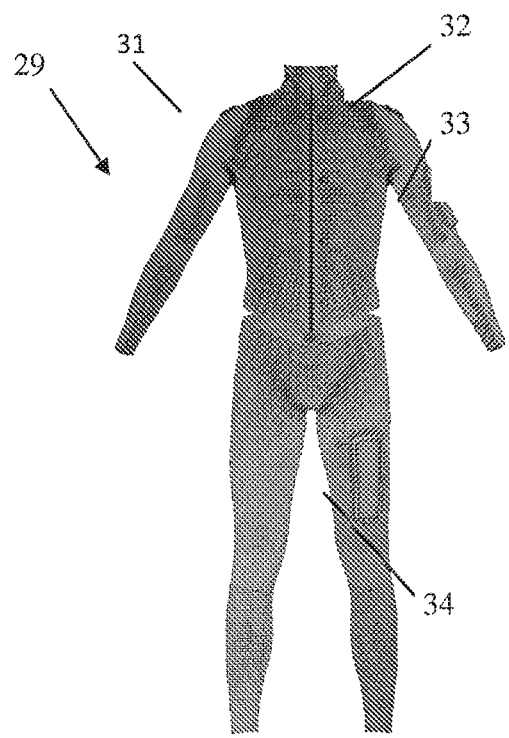

FIG. 15. Wearable apparatus in the form of a flexible cover-suit, front view.

Figure 16:
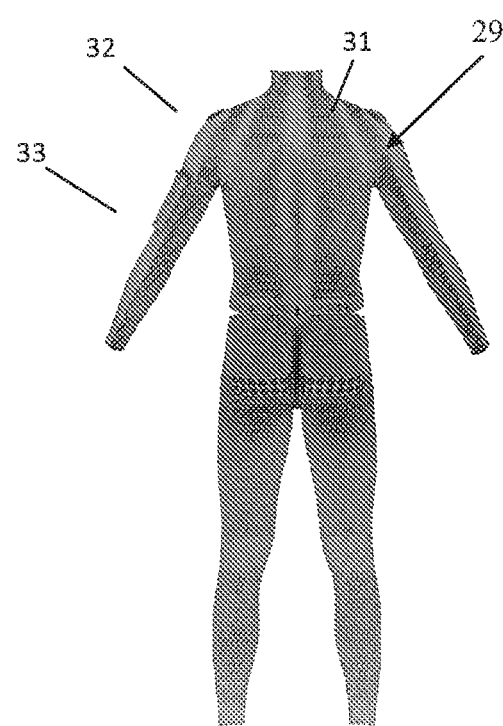

FIG. 16. Wearable apparatus in the form of a flexible cover-suit, end view.

Figure 17:
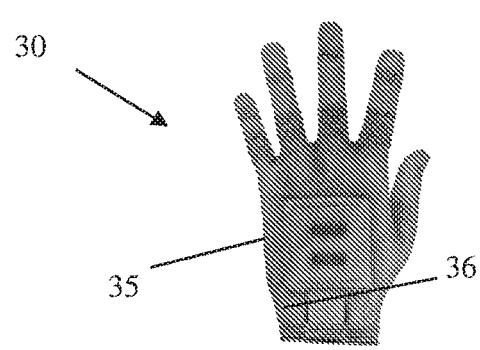

FIG. 17. Flexible cover glove-manipulator, top view.

Figure 18:
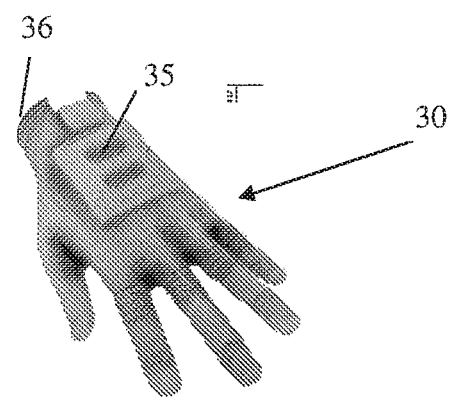

FIG. 18. Flexible cover glove-manipulator, view from the inner side of the palm.

Figure 19:
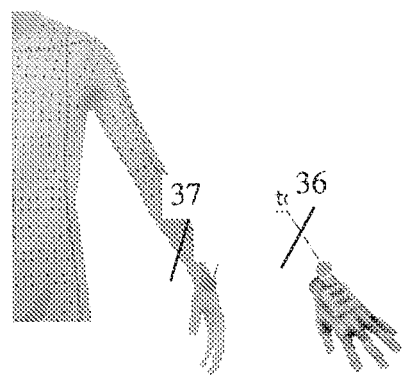

FIG. 19. Junction between the suit and the glove-manipulator.

DESCRIPTION OF PREFERRED EMBODIMENTS OF THE INVENTION

In FIG. 1 the flowchart of the inventive method for the interactive physiological and technological synchronization of a user with a virtual environment is presented.

According to the method, elements 1 for collecting biometric parameters and element 2 for collecting kinematic parameters collect biometric and kinematic parameters of a user and transfer them to devices 3 for collecting parameters. Devices 3 for collecting parameters process the parameters received into signals that are transferred to common computing device 4 with which they are linked by common bus 5. The computing device 4 transfers the burst of signals received through coupling unit 6 to application program launched on a remote data processing unit 7. The application program generates feedback signals and transfers them through the coupling unit 6 to the computing device 4 which processes the feedback signals received and transfers instructions to pulse generator 8 that generates feedback pulses and transfers them to devices 9 for supplying electrical feedback pulses. Devices 9 for supplying electrical feedback pulses supply feedback pulses to feedback pulse supplying elements 10 (hereinafter—electrodes) and/or Peltier elements 11.

The feedback pulses affect nerve endings, which causes muscles or groups of muscles to contract. When a virtual body area of a user meets a virtual object in a virtual environment the application program generates feedback signals and transfers them through the coupling unit 6 to the computing device 4 that generates correspondent instructions for the pulse generator 8 which supplies generated pulses through devices 9 for supplying electrical feedback pulses to electrodes 10 and Peltier elements 11 that are situated in the same area of the actual body of the user.

To ensure the most realistic feedback, signals are provided to the user; electrodes 10 and Peltier elements 11 are supplied with pulses of various amplitude, frequency and stress using the principle of the cascaded distribution of pulses.

In FIGS. 2, 3, and 4, the "soft" electrical pulse distribution principle is presented where the pulses have a various power range—from a stronger to a weaker one and to a complete attenuation.

In FIG. 2, a random electrode 10 system area on the user's body is presented, with the strongest pulse taking place at contact point 10-1.

In FIG. 3, a primary electrical pulse at electrode contact point 10-1 has the most power and is the place of the most intense stimulation. Power of the pulse is calculated electronically and depends on the type of impact in a virtual environment. The power level is picked from a numeric value library sorted in accordance with the types of impact.

A secondary electrical pulse at electrode contact point 10-2 and tertiary at contact point 10-3 are less powerful and are calculated by the software depending on the power of the primary pulse 10-1. The pulse is softened automatically by a required pre-programmed value.

In FIG. 4, the signal is distributed decreasingly, reaching its ground potential at electrode contact point 10-4.

Therefore the cascaded distribution provides the most realistic sensing system.

An intellectual array of electrical pulses allows for transferring complex tactile senses while stimulating residual and secondary sensations.

To provide rational energy consumption, the electrodes operate using the principle of catenation. For example, for supplying pulse to ten electrodes, the pulse is initially supplied to the first electrode, then removed from it and then supplied to the second electrode and so forth. All these are very high-frequency operations and an impression of all electrodes pulsing is created.

For implementation of the claimed method, the present invention envisages two variants of wearable apparatus.

An example of one of the variants is a module made in the form of a flexible three-layer plate 12 (FIG. 5) that includes three working layers (FIG. 6-8). The inner layer 12-1 (FIG. 6) in contact with the user's skin comprises a set of electrodes 10 that are connected by wire 13, and/or Peltier elements (not presented in the drawings), and/or biometric, and/or kinematic sensors (not presented in the drawings). The inner layer 12-2 (FIG. 7) comprises a set of contacts 14 of the electrodes, a set of contacts 15 of the common bus, a set of contacts 16 of the working units, and latches 17.

The inner side of the third layer 12-3 (FIG. 8) comprises matching latches 18, contacts inversed to the ones of the second layer (not presented in the drawings), while the outer side has a slot for connecting working units.

The module can have one, two layers, or be multilayered.

An example of the second variant for the wearable apparatus in the invention is an elastic shell 20 (FIG. 9, 10). On the outer side of the shell 20 (FIG. 9) there are notches 21, in which enforcement ribs 22 are inserted with fixing rods 23 at their ends. The enforcement ribs 22 and the fixing rods 23 form a tie-down system for adjusting the fit of the elastic shell 20 against the body of a user.

On the inner side of the elastic shell 20 (FIG. 10) an electrically conductive coating 24 is layered that is contacting the body of the user. On the electrically conductive coating 24 electrodes 10 and/or Peltier elements (not presented in the drawings) are layered.

One of the variants of the wearable apparatus is a suit 25 (FIG. 11, 12) or a glove-manipulator 26 (FIG. 13, 14) made of modules 12 of different configuration that are linked with elastic cloth 27. It allows for fitting the electrodes tight against a body. Plates 12 are removable which allows replacing the elements in case of a breakdown and launder the suit when necessary.

On the inner side of the suit 25 and the glove-manipulator 26 that bears against the user's body provided are grooves for wire (not presented in the drawing) in which a common bus, ground cable, pulse wire and module wire are placed.

In another variant the wearable apparatus is a suit 29 (FIG. 15, 16) or a glove manipulator 30 (FIG. 17, 18) that are made of elastic shell.

On the outer surface of the suit 29 and the glove-manipulator 30 slots 31, 32, 33, 34, 35 might be provided for installing various units.

Glove-manipulator 26 and 30 is joint to the suit 25 and 29 accordingly through slot 36 situated at the bottom the glove-manipulator 26 and 30 and slot 37 situated at the end of the suit sleeve 25 and 29 (FIG. 19).

When using the suit, a user will pass a calibration stage (determining peak characteristics of the pulses supplied by the generator to the electrodes and Peltier elements). This stage consists of two steps.

$1^{st}$ determining maximum impact by supplying minimal voltage.

$2^{nd}$ determining uncomfortable conditions through maximum impact.

After finding these two parameters, the suit can be used in the most comfortable range of sensations.

Discomfort can be determined using the kinematic parameters collecting elements. In case of discomfort, contractions of human muscles will become visible which will result in a change of joint angles that can be detected by compasses.

Measures of safety and health protection are provided in the suit. For this purpose all adjustable parameters have restrictions and the electrodes in the chest area are low-power.

Operation of the sensing system in the wearable apparatus in the invention is based on signal supply (with various amplitude, frequency, voltage and stress) to an electrode and Peltier elements. The signals affect nerve endings, which causes muscles or groups of muscles to contract and delivers the sense of warmth/cold. Signals are created by the pulse generator. The device for supplying electrical feedback pulses is a set of electronic switches. Electronic switches are responsible for supplying electrical pulse to the electrical pulse generating element. The computing device administers the parameters of the pulse generator and the electrical pulse generating device. It also performs coupling with an application program launched on a remote data processing unit.

Various combinations f turning the electrical pulse supplying elements on and off can recreate various realistic physical sensations from events occurring in a virtual space.

For example for transmitting a pull of gravity and modulating the mass of a virtual object which the user takes with his hand in a virtual space electrical pulses for transmitting tactile senses are supplied to the electrical pulse supplying elements situated on the palm side of the glove-manipulator, and for transmitting the weight of the object—to the electrical pulse supplying elements in the biceps-triceps area of the wearable apparatus.

The principle of primary and secondary (reflected) sensation is achieved by combining various options of turning the electrical pulse supplying elements in various body areas on and off. These sensations appear simultaneously or with a short-term delay of the secondary sensation. The principle is used for transmitting some types of impact, "penetration" in particular, when a virtual object not only touches the body but enters or pierces it.

The cascaded pulse distribution system does not necessarily imply decreasing signal distribution for creating smooth impact effect. Distribution might have a repeatable, ascending or descending pattern. This is vital for proper liquid, gas and fluidal mediums simulation.

A wave-like distribution is common among many physical phenomena. Implementing the cascaded pulse distribution principle in the invention offered allows for simulation of these phenomena and for creating special effects on its basis.

The close setting of electrical pulse supplying elements makes the cascaded distribution principle even more relevant. The accuracy of pulse transmitting increases thereby increasing the accuracy of fluid and gas medium simulation and the general quality if interference in a virtual environment.

Technologies proposed in the invention can be applied in entertainment industry, scientific research (simulation models), education (training programs and simulators), healthcare (treatment, prevention and research), defense industry (simulators, auxiliary devices), film industry, 911 (auxiliary devices), computer graphics industry, on the interact (multidimensional user connection, socially adoptive interface).

A suit for the interactive physiological and technological synchronization of a user with a virtual environment has been developed in accordance with the invention, its trade name is Tesla Suit.

The invention claimed is:

1. A virtual reality system for synchronising a user with a virtual reality environment, the virtual reality system comprising:
   a wearable apparatus comprising a set of electrodes located on an inner surface of the wearable apparatus so as to contact a wearer's skin in use for supplying electrical feedback pulses to provoke physical sensations in the nervous system of the wearer, a feedback supplying device configured to supply electrical feedback pulses to the set of electrodes, and at least one sensor separate from the set of electrodes and configured to collect parameters of the wearer;
   a computing device coupled to said feedback supplying device and said at least one sensor and configured to receive the collected parameters from the at least one sensor, initiate an interaction between the wearer and a virtual object or medium in the virtual reality environment based on the parameters received from the at least one sensor of the wearable apparatus, determine a type of the interaction, and cause electrical feedback pulses to be supplied to the wearer's skin to create a physical sensation of the interaction with the virtual object or medium in the wearer's nervous system, the feedback pulses being supplied in a pattern which depends on the determined type of interaction.

2. The virtual reality system of claim 1, wherein the at least one sensor comprises at least one kinematic sensor configured to collect kinematic parameters of the wearer, said parameters comprising the kinematic parameters.

3. The virtual reality system of claim 2, wherein the at least one kinematic sensor is configured to detect a change of joint angle in the wearer, the kinematic parameters denoting the change of joint angle.

4. The virtual reality system of claim 2, wherein the at least one kinematic sensor is configured to detect a muscle contraction caused by the electrical feedback pulses.

5. The virtual reality system of claim 4, wherein the muscle contraction is detected as a change of joint angle.

6. The virtual reality system of claim 1, the wearable apparatus comprising at least one Peltier element located on the inner surface of the wearable apparatus for delivering warmth or cold sensations to the wearer's skin.

7. The virtual reality system of claim 1, wherein at least one sensor comprises a biometric sensor configured to collect biometric parameters of the wearer, said parameters comprising the biometric parameters.

8. The virtual reality system of claim 1, wherein the set of electrodes and the at least one kinematic sensor are placed on an electrically conductive side of an elastic shell having a tightening system for adjusting the fit of the elastic shell to fit the user's body.

9. The virtual reality system of claim 1, wherein the device is configured to supply the electrical feedback pulses as a cascaded distribution of electrical pulses.

10. The virtual reality system of claim 9, where the cascaded distribution is dependent on the determined type of the interaction.

11. The virtual reality system of claim 1, wherein the wearable apparatus is in the form of a body suit, the inner surface on which the electrodes are placed being an inner surface of the body suit.

* * * * *